Jan. 6, 1959 G. HIRS 2,867,327
FILTER APPARATUS
Filed Jan. 18, 1957 6 Sheets-Sheet 5

INVENTOR.
GENE HIRS
BY
Wallace P. Lamb
ATTORNEY.

United States Patent Office 2,867,327
Patented Jan. 6, 1959

2,867,327
FILTER APPARATUS
Gene Hirs, Detroit, Mich.
Application January 18, 1957, Serial No. 634,963
4 Claims. (Cl. 210—106)

This invention relates generally to fluid filter apparatus and particularly to high capacity fine filtering apparatus.

It is the principal object of my invention to provide an improved fluid filter apparatus having both fine and high filtering capacity.

Another object of the invention is to provide a fluid filter apparatus in which a filter medium of a loose granular type is periodically and automatically cleaned and the apparatus automatically returned to filtering operation without any material loss in filtering time.

Another object of the invention is to provide for an apparatus of the above mentioned character, automatic cleaning of the filter medium and removal of the foreign matter from the apparatus.

Another object of the invention is to provide in an apparatus of the above mentioned character for a relatively long filtering cycle of operation and a relatively short cleaning and foreign matter removal cycle of operation, and to provide for wholly automatically changing from one cycle to the other.

A further object of the invention is to provide an improved filter apparatus capable of the fine filtering of such fluids as fine oils, drinking water, etc.; through a loose granular filter medium held to a backing member solely by the fluid pressure during filtering operation, and to prevent the loose granular filter medium from dropping off of the backing member during the cleaning cycle of operation when the filtering pressure is discontinued.

Other objects of my invention will become apparent from the following detailed description, taken in connection with the accompanying six sheets of drawings in which.

Referring to the drawings by characters of reference, my filter apparatus comprises in general a support 20, a filter 22, a fluid supply means or pump 24, a filter cleaning device 26, and a foreign removal device or conveyor 28. The apparatus has a relatively long filtering cycle of operation and a relatively short filter cleaning cycle of operation, and these cycles are controlled by a control system hereinafter described which makes the apparatus wholly automatic in changing from one operation to the other.

In the general arrangement of the filter apparatus units, the filter 22 and conveyor 28 are both mounted on the support 20, the filter 22 extending directly above the conveyor, and the conveyor extending horizontally through the filter. The filter cleaning device 26 is mounted within the filter 22, above the conveyor 28 (see Fig. 4). Directly below the conveyor 28 are liquid storage tanks including a tank 30 for contaminated liquid to be filtered, a slurry tank 32, and a clean liquid tank 34. The pump 24, driven by an electric motor 36, may be suitably located on a support adjacent the tank 30.

The inlet of pump 24 is connected by a pipe 37 to tank 30 and by a branch pipe 38 to tank 34. In pipes 37 and 38 respectively are manual shut-off valves 40 and 42 by means of which to connect selectively the pump 24 to one or the other of the tanks, as required. The outlet of pump 24 is connected to filter 22 by a supply conduit 44, and an outlet from filter 22 is connected to the clean liquid tank 34 by a conduit 46. In conduits 44 and 46 respectively are controls or solenoids 48 and 50 which are normally open i. e., the solenoids are open during the filtering cycle and are closed to discontinue filtering, preparatory to operation of the cleaning cycle. A second outlet in the filter 22 is connected to tank 30 by a return conduit 52 in which a control or solenoid 54 is normally closed i. e., solenoid 54 is closed during the filtering cycle. The solenoid 54 is opened on start of the cleaning cycle to permit flow of the liquid remaining in the filter following discontinuation of the filtering cycle, back to the contaminated liquid tank 30 for recirculation.

A second pump 58, driven by an electric motor 60, may be used to deliver the clean liquid in tank 34 to one or more points of use.

Figure 10:
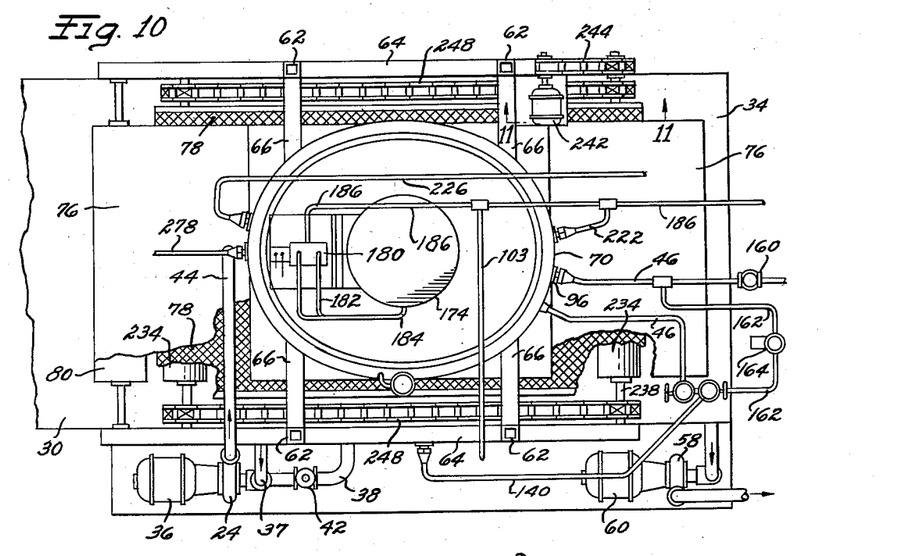
Fig. 10 is a plan view of the filter apparatus.

Preferably the support 20 is a fabricated frame structure including spaced uprights 62 and connecting cross members 64 which may be rigidly secured together, such as by welding. The uprights 62, of which there are four in the present construction, are arranged in pairs on opposite sides of the conveyor 28 with the filter 22 positioned therebetween, and horizontal connecting members 66 rigidly secure the filter 22 to the uprights 62 (see Fig. 10).

In general, the filter 22 comprises a head 70, a liquid filter medium 72, and a cleaning cycle filter medium 74. The head 70 provides a filter chamber 76 wherein the filter medium 72 is mounted to filter the liquid, and below the filter medium 72 is the filter medium 74 to filter the foreign matter cleaned from medium 72 during the cleaning cycle. The filter medium 74 is a portion of a filter media strip that is supported on a belt of conveyor 28. A relatively inexpensive filter material, such as paper is used so that it can be disposed of with the foreign matter. A roll of this filter paper is shown mounted at the feed end of conveyor belt 78 and arranged to feed flat onto the belt 78 by movement thereof. It will be understood by those skilled in the art that either the paper 74 or the belt 78 may be considered the conveying means, or either may be considered the filtering medium. In the present apparatus the filter paper is used so as to keep the belt 78 clean and free of clogging material.

The head 70 comprises two casing sections or shells including an upper shell 82 and a lower shell 84 arranged in vertical alignment. A removable cover or top 86 is provided so that access may be had to the interior of the head 70, and a suitable gasket 88 is provided between the shell 82 and cover 86 to insure a fluid tight joint therebetween. The lower end of the shell 82 and the opposed upper end of lower shell 84 are open and preferably flanged to provide seating surfaces for a pair of gaskets 90 and 92 which are respectively secured to shells 82 and 84. Secured to and within the lower shell 84, adjacent the top thereof is a grating 91 that is covered by a wire mesh screen 93 to give support to belt 78. The belt 78 and filter medium 74 carried thereby extend between the gaskets 90 and 92, the shells 82 and 84 being separable to release the belt and filter medium for movement. In the present arrangement, the upper shell 82 is stationary and the lower shell 84 is movable, although it will be apparent to those skilled in the art that either or both of the shells may be movable to effect separation therebetween. In this connection, reference may be had to my pending application, Serial No. 571,020 wherein instead of the shells being movable, the gaskets are inflatable to seal the joint between spaced shells and are deflatable to release the belt for movement.

Suitable fittings 94 and 96 respectively attach the supply and discharge 44 and 46 to the side wall of upper shell 82 and similarly a fitting 98 attaches the return conduit 52 to the lower shell 84, adjacent the bottom thereof. As shown, conduit 52 is a flexible conduit or hose in view of lower shell 84 being movable.

A power element, such as the air cylinder designated 100, normally holds the lower shell 84 up in closed position against the counter force of the liquid under pressure within the head 70, the gaskets 90 and 92 being displaced to effect a fluid tight joint between the shells. The air cylinder 100 is of the conventional type controlled by a double acting solenoid 102 connected to establish communication with one or the other end of the cylinder and a compressed air source by conduit 103 to move the piston up or down, as required. The piston is connected by the usual connecting rod 104 to the bottom of shell 84.

In order to provide an efficient filter with respect to filtering capacity, the filter medium 72 is composed of a multiple of filter mediums 106 which collectively present a larger filtering area to the liquid within head 70 than the cross sectional area of the head. In addition to obtaining high filtering capacity, I provide for fine filtering of such liquids as fine oils, water for drinking purposes etc., and to this end use a fine granular material, such as fuller's earth, as the filter medium. This medium is deposited on opposite sides of each of a number of backing element or members 108, within head 70, by a so-called pre-coating operation in which a mixture of liquid and fuller's earth is pumped from the slurry tank 30 and circulated through head 70 under pressure until substantially all of the fuller's earth is deposited on the backing members. The backing members 108 extend upright within filter chamber 76 in horizontal spaced relation and are rigidly secured at top and bottom thereof by connector plates 110 and 112 respectively to top and bottom cross members 114 and 116 which are in turn rigidly secured to shell 82.

Figure 5:
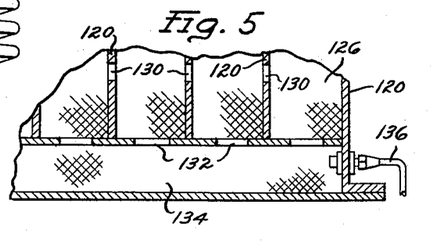
Fig. 5 is a fragmentary vertical sectional view, taken along line 5—5 of Fig. 4.

The backing members 108 may be of any suitable construction, for example, each may comprise a plurality of upright horizontally spaced plates 120 secured, such as by welding, to top and bottom plates 122 and 124 respectively to provide a grate-like backing. Overlying the opposite side edges of the backing plates 122 and 124 of each of the backing members are fine mesh screens 126 that may be held in place by frame moldings 128. As is shown more clearly in Fig. 5, the vertical plates 120 are provided with holes 130 therethrough for passage of the filtered liquid, and bottom plate 124 has holes 132 through which the filtered liquid passes to an outlet manifold 134 at the bottom of each of the backing members. The manifolds 134 are each communicatively connected by pipes 136 to a common outlet manifold 138 which in turn is connected by a pipe 140 to outlet fitting 96 and therefore to conduit 46. In communication with conduit 46 is a branch conduit 140 which discharges into slurry tank 32 and conduits 46 and 140 are provided respectively with manual shut-off valves 142 and 146 for selectively connecting the outlet manifold 138 to either the slurry tank 32 or the clean liquid tank 38, as desired.

During the precoating operation and the filtering operation that follows, the granular material of the filter mediums 106 is held to the backing members 108 by the liquid pressure within the head 70, but during the cleaning cycle this liquid pressure isn't present and so to prevent the granular pre-coating from falling off of the backing members 108, I provide a suction pump 150 to reduce the pressure on the inner surfaces of the filter medium 72 below atmospheric pressure. The intake of the suction pump 150 is connected by a conduit 152 to the side wall of shell 82 by a suitable fitting 154, and to the inner end of said fitting is connected a conduit 156 which has branch conduits 158 that connect respectively to the backing members 108 in communication with the interiors thereof. A normally closed solenoid 160 in conduit 152 controls the reduction of pressure within the backing members 108, the solenoid 160 being between the suction pump 150 and fitting 154.

Connected to the conduit 152, between fitting 154 and solenoid 160, is a conduit 162 in which there is a normally closed solenoid 164 which, as will later be more clearly understood, opens to relieve air pressure within the head 70. Conduit 162 may discharge into the slurry tank 32, as shown, as some liquid may drain through this conduit when solenoid 164 opens to relieve the head pressure.

The cleaning device 26 is provided to clean periodically the accumulated foreign matter from the surfaces of the filter media 106 and includes a number of scrapers or knives 166 and 168 and a movable carrier 170 therefor. The carrier 170 is suspended and slidably supported on spaced horizontal rails 172 along which the carrier is horizontally moved in an indexing operation, hereinafter described. At the opposite ends thereof, the rails 72 are slidably mounted on vertical guide rods 173 that are rigidly secured at top and bottom thereof to shell 82. Vertically guided by rods 173, the carrier 170 is movable between the positions shown in full lines and in dot and dash lines in Fig. 4. On downward movement of the carrier 170, the knives 166 remove the foreign material and a small amount of the filtering material from corresponding sides of the backing members 108, and on return or upward movement of the carrier, knives 168 remove the foreign matter and small amounts of the filtering material from the corresponding opposite sides of the backing members.

Figure 1:
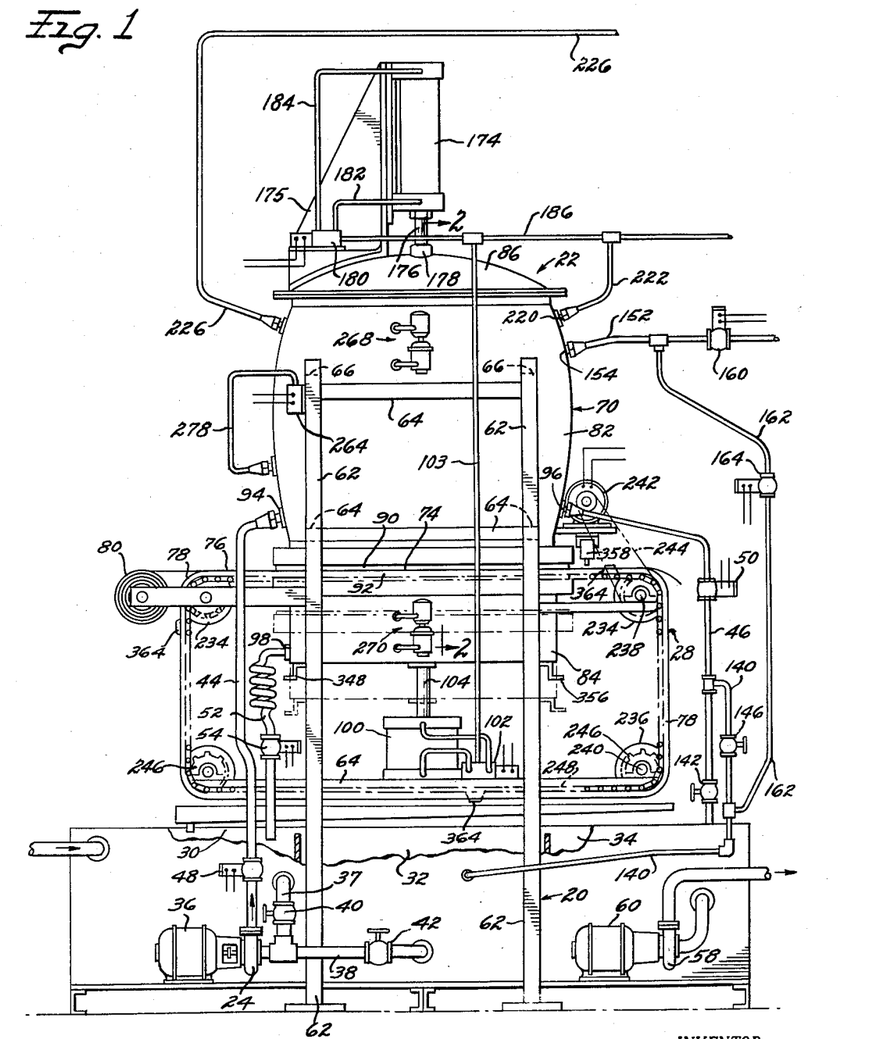
Fig. 1 is a side elevation of a fluid filter apparatus embodying features of my invention.
Figure 2:
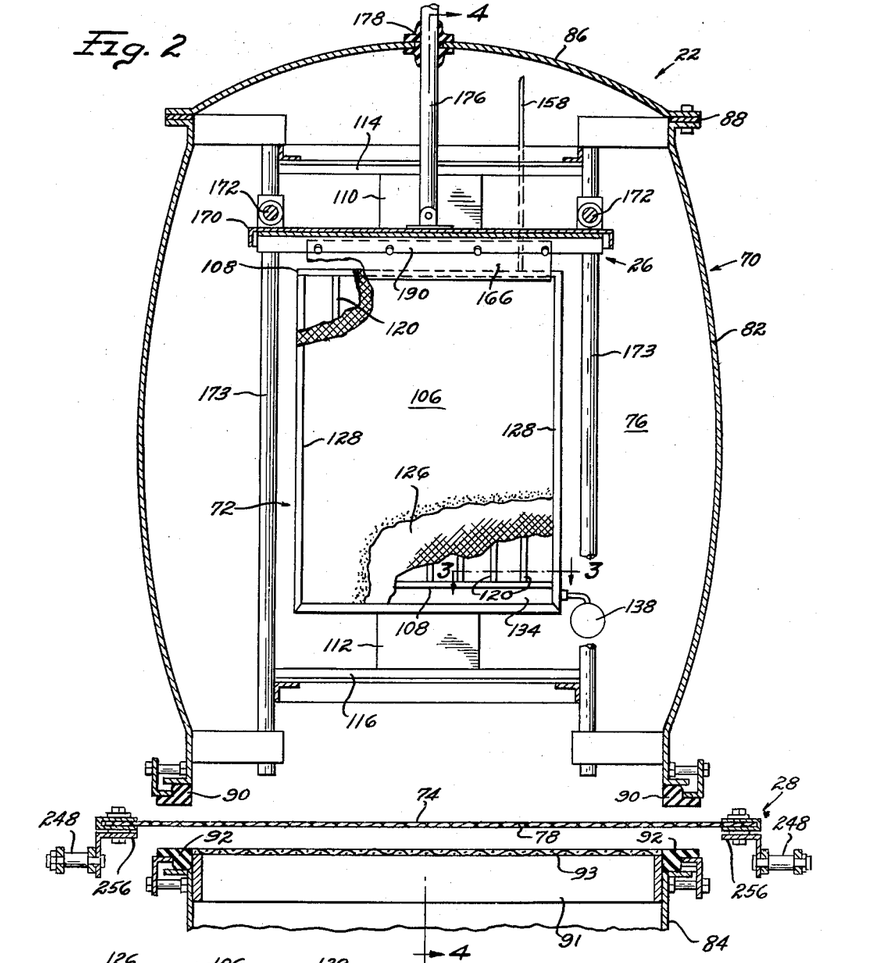
Fig. 2 is a vertical sectional view, taken along line 2—2 of Fig. 1.
Figure 3:
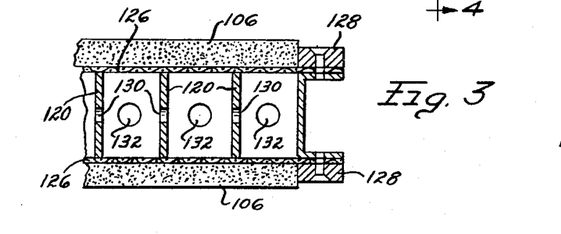
Fig. 3 is a fragmentary cross sectional view, taken along line 3—3 of Fig. 2.
Figure 4:
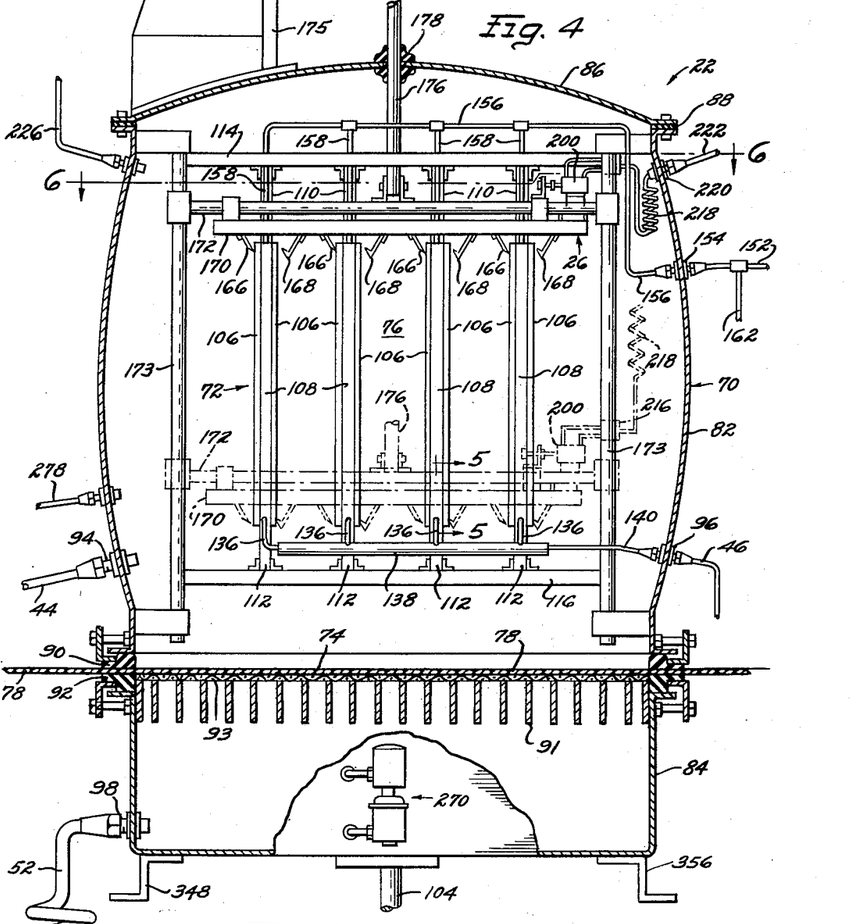
Fig. 4 is a vertical sectional view, taken along line 4—4 of Fig. 2.

After downward movement of the carrier is completed it is indexed horizontally on rods 172 to the left facing Fig. 4 so that knives 168 will engage the filtering material.

A power element, such as an air cylinder 174 is provided to move the carrier 170 vertically and may be mounted on the cover 86 of head 70 by a bracket 175. The piston of air cylinder 174 is connected by the usual connecting rod 176 to the rails 172 and rod 176 extends into the head through a grommet-like seal 178 that is secured in and to the cover 86. A solenoid 180 controls the air cylinder 174 and is connected to opposite ends thereof by conduits 182 and 184, the inlet to the solenoid being connected to the source of compressed air by a conduit 186. Normally, the bottom of the cylinder 174 is in communication with the solenoid 180 and as a consequence, the knife carrier 170 is held in the raised position shown in Fig. 4.

The carrier 170 is a rectangular frame having spaced horizontal side members 188 connected together by spaced cross members 190 to which the knives 166, 168 are secured. As shown, the knives 166, 168 extend coextensive with the width of the filter media within the side frame moldings 128.

Figures 6, 7, 8, 9:
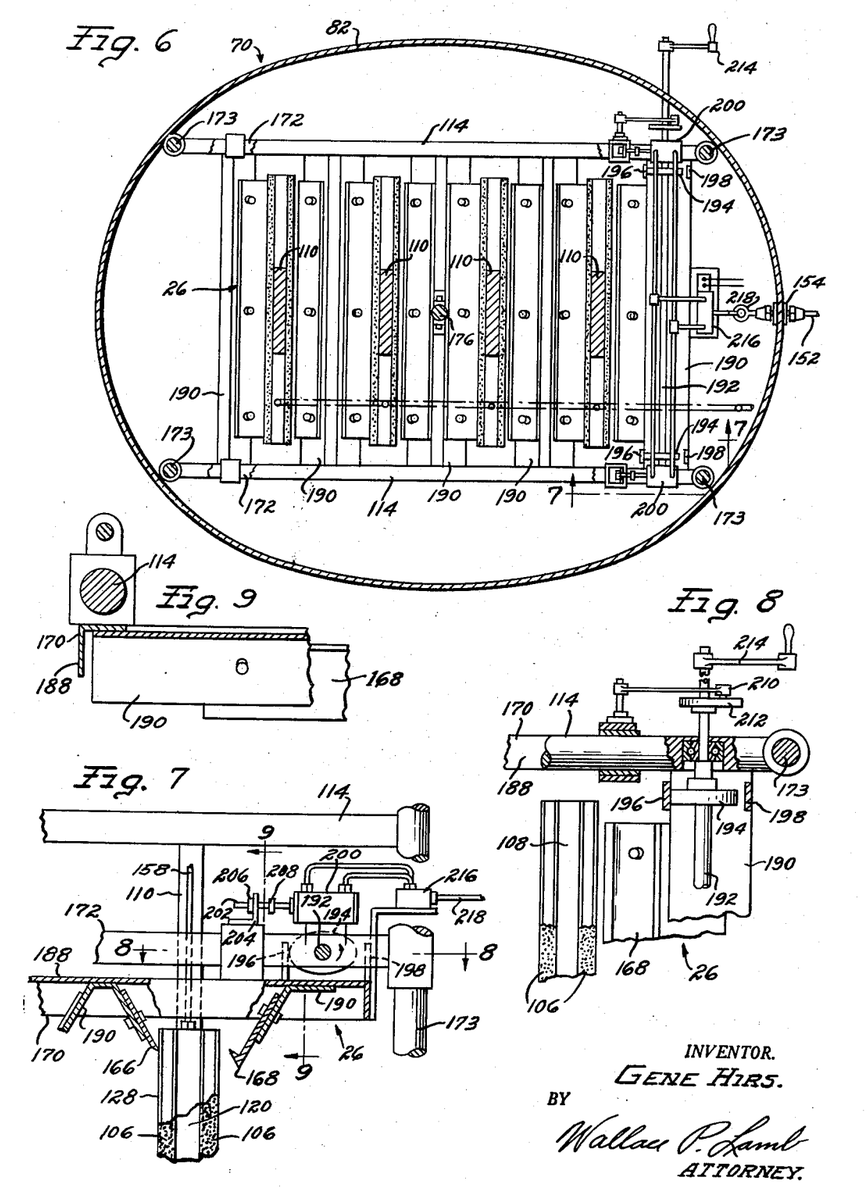
Fig. 6 is a horizontal cross sectional view, taken along line 6—6 of Fig. 4.
Fig. 7 is an enlarged fragmentary view partly broken away and in section, taken along line 7—7 of Fig. 6.
Fig. 8 is a fragmentary horizontal sectional view, taken along line 8—8 of Fig. 7.
Fig. 9 is a vertical sectional view, taken along line 9—9 of Fig. 7.

Mounted on the carrier rails 172, adjacent one end of the carrier 170, is an indexing mechanism for the knives 166, 168 which mechanism includes a rotatable shaft 192 that is journaled in bearings in the carrier rails 172. Affixed to the shaft 192 for rotation therewith is a pair of cams 194 respectively positioned adjacent the rails 172 and between upright stops 196 and 198 that are carried by the frame of carrier 170. A pair of air cylinders 200 are provided to move the carrier 170 horizontally and are mounted above cams 194 respectively on the carrier rails 172. The piston in each of the air cylinders 200 is connected to a horizontal shaft 202 which extends respectively through clearance holes in upright abutments 204 that are carried by carrier 170. Affixed to each of the shafts 202, on opposite sides of each abutment 204 are spaced abutments 206 and 208. With reference to Fig. 7, it will be seen that abutments 206 engage the carrier abutments 204 to move the carrier 170 to the right, and on reverse action of the air cylinders 200, abutments 208 engage the abutments 204 to move the carrier to the left. In its raised or starting position, the carrier 170 is moved to the right for the purpose of engaging the knives 166 slightly into the adjacent filter media 106 so as to remove some of the granular material upon downward movement of the carrier 170. When the carrier 170 has reached its "down position," the carrier is moved to the left to engage knives 168 with the filter material on the adjacent sides of the backing members 108 to remove a small amount of the material on upward movement of the carrier 170. In order that substantially the same amount of the filter material is removed from the filter media for each traverse of the knives, the cams 194 are rotated by horizontal movement of carrier 170 through an angle corresponding to the said carrier movement. To this end, I use a pawl 210 and a ratchet 212. The pawl 210 is pivoted at one end thereof on the carrier 170, and the ratchet 212 is affixed to the cam shaft 202 such that each time the carrier moves to the left, facing Fig. 7, the shaft 202 and consequently the cams 194 are correspondingly rotated in the direction of the arrow. The cams 194 are shown in the starting positions thereof, that is with their high points abutting the stops 196. Thus it will be seen, that for successive cleaning operations, the cams 194 will permit an increase in horizontal movement of the carrier 170 by a distance equal to the thickness of material removed by the knives. After a number of cleaning operations, it becomes necessary to apply new filter material to the backing members 108, and cams 194 are returned to their starting positions by means of a hand crank 214 on shaft 202.

The air cylinders 200 are under control of a solenoid 216 which is a two-way solenoid connected by the usual conduits to both ends of each of the cylinders 200. A conduit 218 connects the inlet of the solenoid 216 to a fitting 220 in shell 82, and the fitting 220 is connected by a conduit 222 to the compressed air line 186. As illustrated in Fig. 4, the conduit 218 is a flexible conduit or hose to allow for movement of the carrier 170.

Figure 14:
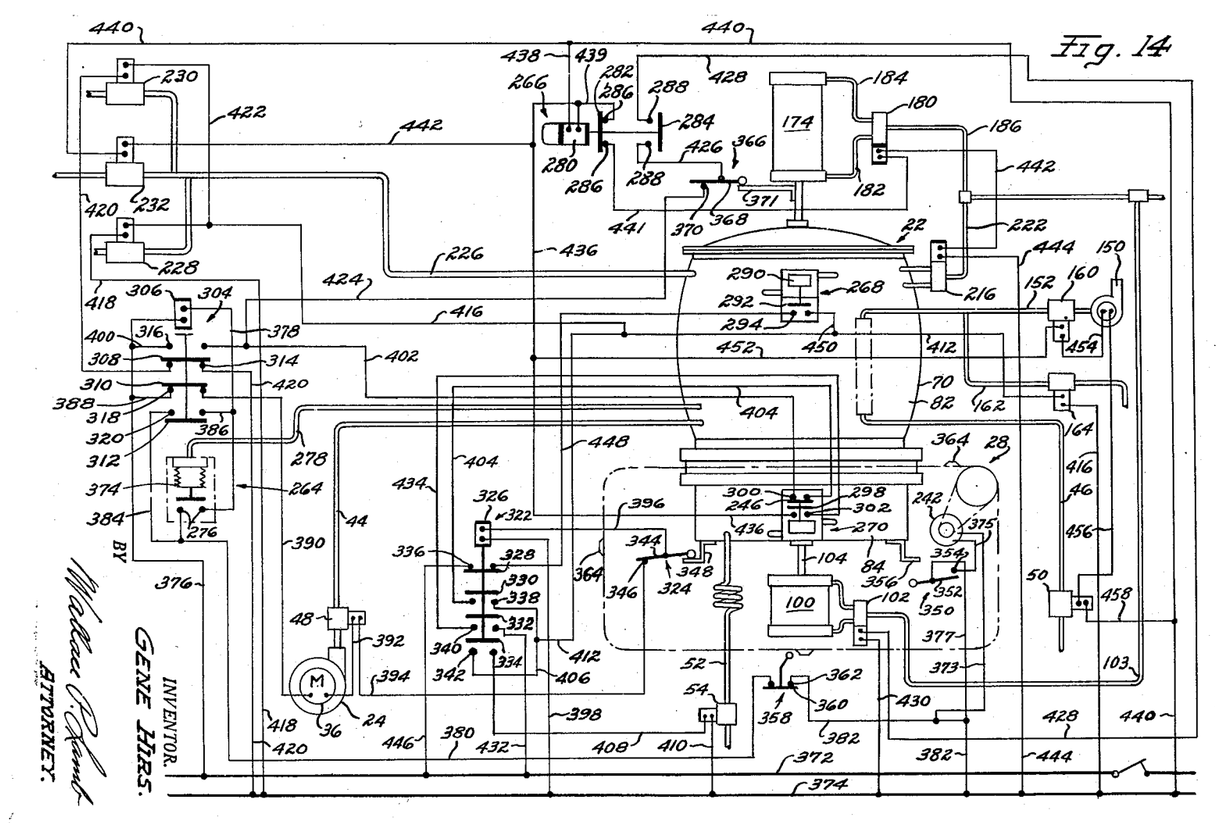
Fig. 14 is a diagrammatic view showing the apparatus, its controls and circuitry.

In order to evacuate the liquid from the head 70 as quickly as possible, preparatory to cleaning the filter media 106, I provide for the introduction of compressed air into head 70 through a fitting 224 in shell 82. The fitting 224 is connected to the source of compressed air by a conduit 226 in which there is a normally closed solenoid 228 that controls flow of compress-air into the head. Also in communication with the interior of head 70 is a normally closed pressure relief solenoid 230 and a normally closed vent solenoid 232 (see Fig. 14).

Figures 11, 12, 13:
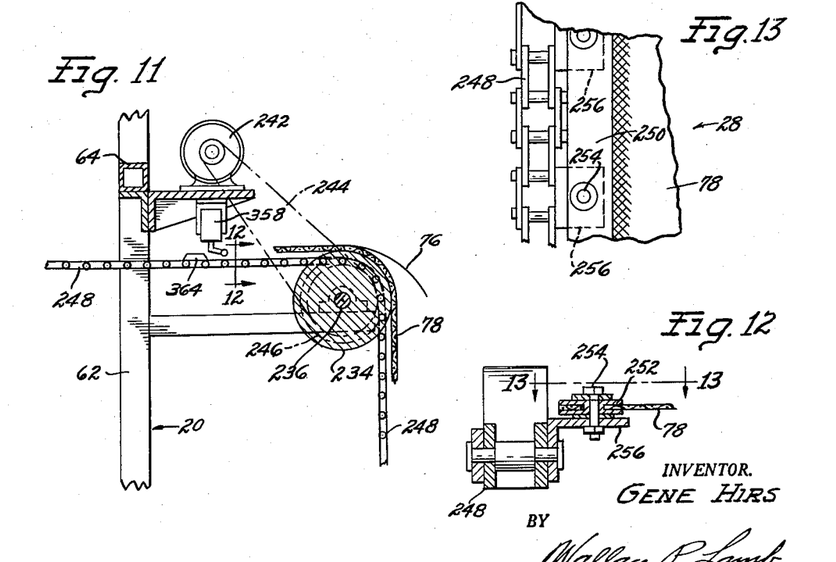
Fig. 11 is an enlarged fragmentary view in vertical section, taken along line 11—11 of Fig. 10.
Fig. 12 is an enlarged fragmentary sectional view, taken along line 12—12 of Fig. 11.
Fig. 13 is a fragmentary plan view, taken along line 13—13 of Fig. 12.

In the present apparatus, the conveyor 28 comprises two upper spools 234 and two lower spools 236 around which the endless belt 78 travels. The spools 234 and 236 are rotatably supported on shafts 238 and 240 respectively which may be journaled in mountings suitably supported, for example, on the frame uprights 62. An electric motor 242 is arranged to drive one of the shafts 238 through a chain drive 244 and any suitable speed reduction mechanism may be used. On the shafts 238 and 240 are sprockets 246 around which endless chains 248 travel and carry the belt 78 therebetween. As shown in detail in Fig. 12 and in Fig. 13, the belt 78 is reinforced along its side edges with a heavy fabric binding 250 in which metal eyelets 252 are spaced to receive bolts 254 which attach the belt 78 to inturned lugs 256 on the chains 248.

Referring now to the automatic control system for my apparatus, this system comprises a primary and automatic control, or pressure responsive switch 264 and three delayed action controls including a timer 266, an upper liquid level responsive control or switch 268 and a lower liquid level responsive control or switch 270. The switch 264 may be suitably mounted on one of the uprights 62. The liquid level responsive switch 268 is mounted on the shell 82 in communication with the interior of head 70, adjacent the top thereof. The lower liquid level responsive switch 270 is mounted on the lower shell 84 in communication with the interior thereof and adjacent the bottom of the shell.

As diagrammatically represented, the pressure responsive switch 264 may comprise a bellows 272 having a movable end wall carrying a contact 274 engageable with a pair of fixed contacts 276. A tube 278 connects the bellows 272 to the side wall of shell 82 in communication with the interior of the head 70.

The timer 266 is shown as a delayed action switch including a coil 280, and an armature that carries a pair of contacts 282 and a second pair of contacts 284. The contacts 282 and 284 respectively cooperate with pairs of fixed contacts 286 and 288. Normally, contacts 286 are closed and contacts 288 open, as shown.

The upper liquid level responsive switch 268 includes the usual casing wherein a float 290 carries a contact 292 that is cooperable with a pair of fixed contacts 294. Normally, the contacts 294 are open, as shown. The lower liquid level responsive switch 270 is similar to the upper except that the float of the lower switch carries two pairs of contacts 296 and 298. These contacts cooperate respectively with pairs of fixed contacts 300 and 302. Normally, contacts 300 are closed and contacts 302 open, as shown.

In response to a predetermined increase in pressure in head 70, the switch 264 energizes a control relay 304 to initiate change-over from the filtering cycle to the filter cleaning cycle. The relay 304 has the usual coil 306, and an armature that carries three contacts 308, 310, and 312. Cooperable with movable contact 308 is a pair of normally closed contacts 314 and a pair of normally open contacts 316. Movable contact 310 normally bridges a pair of contacts 318, and the third movable contact 312 is normally open with respect to a pair of contacts 320.

A second relay, designated generally by the numeral 322, is under the control of the pressure responsive switch 264 and also is controlled by the separation movement of lower shell 84 through the operation of a limit switch 324. The relay 322 includes a coil 326 and an armature that carries four pair of contacts, 328, 330, 332, 334. Contact 328 is normally closed with respect to a pair of contacts 336 that are bridged upon energization of coil 326. The remaining contacts 330, 332, and 334 are normally open and as shown, respectively engage contacts 338, 340, and 342. The limit switch 324 is represented as comprising a pivoted contact 344 that is normally held in engagement with a fixed contact 346 by an abutment 348 on the lower shell 84 such that when the shell moves down, contact 344 will pivot and disengage from fixed contact 346.

Controlling the conveyor drive motor 242 is a limit switch 350 that is actuated by downward movement of shell 84 to insure that the conveyor 28 doesn't operate until the shells have separated sufficiently to allow proper clearance with the conveyor. The limit switch 350 comprises a pivoted contact 352 and a fixed contact 354. Contact 352 is biased toward and is normally in open position, the contact being engaged by an abutment 356 on shell 84 and moved to closed position just before the shell 84 reaches its fully open position. Also the conveyor drive motor 242 is controlled by a conveyor actuated switch 358 to stop the conveyor after belt 78 has traveled sufficiently to replace the filter paper within head 70. Switch 358 includes a normally closed movable contact 360 engaging a pair of fixed contacts 362. Carried by the conveyor chains 248 are spaced abutments 364 arranged to engage and open contact 360.

Controlling the operation of the air cylinder 100 in conjunction with timer 266 is a limit switch 366 which is normally closed and is operated in accordance with movement of the knife carrier 170. The limit switch 366 includes a pivoted contact 368 and a fixed contact 370, the pivoted contact 368 being biased to open position. An abutment 371 on the air cylinder connecting rod 176 engages and closes contact 368 when the knife carrier 170 is in its raised or starting position.

The numerals 372 and 374 designate main leads from a suitable source of electric power. From main line 372, a lead 376 connects to one end of the control relay coil 306, and from the other end of the coil, a lead 378 connects to one of the contacts 276 of the pressure responsive switch 264. From the other contact 276, a lead 380 connects to one of the contacts 362 of limit switch 360 which has its other contact connected by a lead 382 to the other main line 374. Thus, when the switch 264 bridges contacts 276, the circuit is completed to the control relay coil 306. A holding circuit is provided for coil 306 through relay contacts 320 which are connected by leads 384 and 386 respectively to leads 376 and 378. A lead 373 connects one terminal of the conveyor motor 242 to lead 382 and the other motor terminal is connected by a lead 375 to the fixed contact 354 of limit switch 350 which has its movable contact 352 connected by a lead 377 to main line 374. Thus the conveyor drive motor 242 is in circuit with limit switches 350, 358, control relay contacts 320, and relay coil 306.

A lead 388 connects relay contact 318 to lead 376 and therefore to main line 372, and the other contact 318 is connected by a lead 390 to one terminal of the pump motor 36. From the other terminal of motor 36, a lead 392 connects to one end of the coil of solenoid 48, and from the other end of said coil, a lead 394 connects to the fixed contact 346 of limit switch 324. The movable contact 344 of the limit switch 324 is connected by a lead 396 to one end of relay coil 326 which has its other end connected by a lead 398 to main lead 374. Thus, the pump 24 is operating, solenoid 48 is open, and relay coil 326 is energized providing, of course, that limit switch 324 is closed.

A lead 400 connects control relay contact 316 to lead 376 and therefore to main line 372, and a lead 402 connects the other relay contact to one of the normally closed contacts 300 of liquid level responsive switch 270. From the other contact 300, a lead 404 connects to one of the contacts 338 of relay 322, and from the other of the contacts 338 a lead 406 connects to one of the contacts 342 of the relay. A lead 408 connects the other of contacts 342 to the coil of solenoid 54 which is connected to main line 374 by a lead 410. Thus when control relay contacts 316 are closed, the contacts 342 of relay 322 are closed completing the circuit of solenoid 54 through the closed contacts 300 of the liquid level responsive switch 268. A lead 412, connected to lead 406 connects to one end of the coil of solenoid 164, the other end of said coil being connected by a lead 416 to main line 374, thus connecting solenoid 164 in circuit with relay contacts 338, with the contacts 300 of liquid level responsive switch 276 and with the control relay contacts 316. A lead 416 connects one end of the coil of solenoid 228 to lead 412, and the other end of the coil is connected by a lead 418 to main line 374 whereby solenoid 228 is in circuit with control relay contacts 326, the contacts 300 of liquid level responsive switch 270, and the contacts 338 of relay 322. This circuit is as follows: From main line 372 through leads 376, 400, relay contacts 316 when bridged, lead 402, normally closed contacts 300 of liquid level responsive switch 270, lead 404, relay contacts 338 when bridged, leads 406, 412 and 416, solenoid 228, and lead 418 to the other main line 374. One of the control relay contacts 314 is connected by a lead 420 to main line 374 and the other of the contacts 314 is connected to one end of the coil of solenoid 230. A lead 422 connects the other end of the coil of solenoid 230 to lead 416. The circuit of solenoid 230 is as follows: From main lead 372 through lead 446, relay contacts 336, lead 488, contacts 294 of the upper liquid level responsive switch, leads 450, 412, 416, 422, solenoid 230, lead 420, control relay contacts 314, and lead 420 to the other main line 374.

Connected to lead 402 and thus through control relay contacts 316 to main line 372 is one end of a lead 424 which has its other end connected to the fixed contact 370 of limit switch 366. The movable contact 368 of switch 366 is connected by a lead 426 to one of the normally open contacts 288 of timer 266, the other of the contacts 288 being connected by a lead 428 to the air cylinder solenoid 102 which is connected to main line 374 by a lead 430.

A lead 432 connects one of the contacts 340 of relay 322 to main line 372, and the other of the contacts 340 in connected by a lead 434 to one of the normally open contacts 302 of the lower liquid level responsive switch 270. From the other of the contacts 302, a lead 436 connects to one end of the coil 280 of timer 266 which has the other end of said coil connected by leads 438 and 440 to main lead 374. Lead 440 also connects to one end of the coil of solenoid 232 from the other end of which a lead 442 connects to lead 436. To lead 436 is also connected one of the timer contacts 286 by a lead 439, and from the other contact 286, a lead 441 connects to one end of the coil of the upper air cylinder solenoid 180. The other end of the solenoid coil is connected to the coil of solenoid 216 by a lead 442, and the coil of solenoid 216 is connected by a lead 444 to main line 374. Thus, solenoids 216, 180, timer contacts 286, contacts 302 of the lower liquid level responsive switch 270, and contacts 340 of relay 322 are in circuit. A lead 446 connects one of the contacts 336 of relay 322 to main line 372 and the other of the contacts 336 is connected by a lead 448 to one of the contacts 294 of the upper liquid level responsive switch 268 which has its other contact 294 connected to lead 412 by a lead 450. Thus, the contacts 294 of the liquid level responsive switch 268 are in circuit with the normally closed solenoids 164, 228 and 230 to insure that the solenoids will not open during the filtering operation, or when head 70 is full of liquid.

A lead 452 from one end of the coil of solenoid 160 is connected to lead 436 and therefore to main lead 372 through liquid level responsive switch contacts 302 and relay contacts 340. From the other end of the coil of solenoid 160, a lead 454 connects to one terminal of the motor of suction pump 150 which has another terminal connected by a lead 456 to one end of the coil of solenoid 50. The other end of the coil of solenoid 50 is connected by a lead 458 to lead 440 and thus to the main line 374. Thus the normally closed solenoids 50, 160 and the normally inactive suction pump 150 are under the control of the lower liquid level responsive switch 270, the contacts 302 of which are normally open.

It is to be understood that in the drawings, all movable elements of the filter apparatus and controls including valves and switches are shown in the positions they will assume during the filtering operation and that such positions are herein referred to as the normal positions of the elements.

*General operation*

During the filtering cycle of operation, contaminated liquid to be filtered is supplied by the pump 24 to head 70 wherein the liquid is forced through the filter media 106 and the clean liquid discharged through conduit 46 to the clean liquid tank 34. In time the foreign matter filtered from the liquid accumulates on the surfaces of the filter media and also clogs the media just under the surfaces thereof with the result that filtering becomes inefficient. Clogging of the filter media, of course, increases the back pressure within the filter chamber 70 and when the back pressure increases to a predetermined pressure, the switch 264 is actuated thereby and functions to discontinue the filtering operation and initiate the cleaning cycle operation. Actuation of the switch 264 stops the pump 24, closes supply conduit solenoid 48, opens drain solenoid 54, opens compressed air solenoid 228, and opens air evacuation oslenoid 164. The opening of the solenoid 228 introduces compressed air into the head 70 for the dual purpose of (1) maintaining a pressure within the head 70 to keep the loose filtering material of media 106 from falling off of the backing members 108 and (2) aiding gravity to drain the liquid from the head rapidly. The liquid draining from the head 70 returns to the contaminated liquid tank 30 through return conduit 52. When almost all of the liquid has been evacuated from the head 70, the liquid level responsive switch 270 operates to discontinue the supplying of compressed air to the head and start suction pump 150 to effect a partial vacuum within the head to keep the granules of the filter media 106 from falling off of the backing members 108. Thus, during filtering operation, the liquid pressure within head 70 holds the filter media granules to the backing members 108 and this function is taken over successively by the compressed air and the suction pump 150, when the filtering cycle is discontinued. The change over from the use of compressed air to the use of the suction pump 150 to hold the filter media granules to the backing members 108 entails the closing of solenoids 164, 228, 160, 50 and the opening of solenoids 232 and 160. In addition, the liquid level responsive switch 270 causes the timer 266, upper air cylinder 180, and the knife carrier indexing solenoid 216 to be energized. The air cylinder 174 now moves the knife carrier 170 down and the carrier is then indexed under control of solenoid 216 and then returned to its raised position. This vertical operation of the knife carrier 170 removes the foreign matter and small amounts of the granules from the filter media 106 which drops down onto the filter paper 74 on conveyor belt 78. The timer now deenergizes the air cylinder solenoid 180 and the indexing control solenoid 216 and energizes the solenoid 102 of the lower air cylinder 100 which now acts to move the lower shell 84 down away from upper shell 82. When the shell 84 approaches its lower limit position, it starts conveyor motor 242 which then moves the foreign matter out of the head 70 and replaces the disposable filter paper 74 with a clean portion from roll 80. The conveyor then opens the limit switch 358 which opens the holding circuit of control relay 304 and initiates return of the apparatus to its filtering cycle of operation. This entails the closing of head 70 followed by the starting of liquid supply pump 24 and in general to the return of the various controls to the normal positions shown in Fig. 14.

*Detail operation*

During the filter cycle of operation, the pump 24 supplies contaminated liquid to the filter head 70 through conduit 44 and clean liquid is discharged from the head and is conducted through conduit 46 to the clean liquid tank 34. This operation continues so long as the contacts 276 of pressure responsive switch 264 remains open, and the circuit of the pump motor 36 is as follows: From main line 372 through leads 376, 388, control relay contacts 318, lead 390, motor 36, lead 392, solenoid 48, lead 394, limit switch contacts 346, 344, lead 396, relay coil 326, and lead 398 to the other main lead 374. Thus, during the filtering operation, the control relay 304 remains deenergized and as a consequence, pump 24 operates, and relay 322 is energized providing, ofcourse, that limit switch 324 is closed.

As filtering continues and the filter medium becomes clogged by accumulation of foreign matter thereon, the pressure within head 70 increases correspondingly and when the pressure reaches a predetermined pressure, switch 264 is closed which initiates change-over from filtering cycle to the cleaning cycle. The closing of switch 264 completes the following circuit to energize control relay coil 306: From main line 372 through lead 376, relay coil 306, lead 378, switch contacts 276, lead 380, limit switch contacts 362, and through lead 382 to the other main line 374. The energization of control relay coil 306, closes the relay contacts 316 and 320 and opens the relay contacts 314 and 318. The closing of contact 320 establishes a holding circuit through leads 384 and 386 to the relay coil 306 to avoid deenergization thereof upon decrease in pressure in head 70.

The breaking of contacts 318 opens the circuit of the pump motor 36, solenoid 48 and the coil 326 of relay 322. This, of course, stops pump 24, allows the solenoid 48 to bias to closed position to prevent backflow through supply pipe 44, and deenergizes relay coil 326. The opening of contacts 314 has no function at this time other than to set the contacts for closing a circuit mutually with the liquid level responsive switch 268 just prior to the resuming of the filter operation. The closing of relay contacts 316 energizes the drain control solenoid 54 which then opens to allow discharge of the liquid remaining in the head at termination of the filtering cycle. The circuit of the solenoid 54 is as follows: From main line 372 through leads 376, 400, relay contacts 316, lead 402, closed contacts 300 of the liquid level responsive control 270, lead 404, contacts 333 of relay 322, lead 406, relay contact 442, lead 408 through solenoid 54 and to the other line 374 through lead 410.

Substantially simultaneously with the closing of solenoid 48 and the opening of drain solenoid 54, solenoid 228 opens to introduce compressed air through conduit 226 into the top of head 70 to quickly evacuate the liquid and solenoid 164 opens to permit air evacuation. The circuit of solenoid 228 is as follows: From the main line 372 through the leads 376, 400, control relay contacts 316, lead 402, contacts 300 of the liquid level response control 270, lead 404, relay contacts 338, leads 412, 416, solenoid 228 and through lead 418 to the other main line 374. The circuit of the air evacuation solenoid 164 is as follows: From main line 272 through leads 376, 400, control relay contacts 316, lead 402, contacts 300 of liquid level responsive control 270, lead 404, relay contacts 338, lead 412, solenoid 164, and through lead 416 to the other main line 374. To recapitulate, it will be seen that at this stage of operation, pump 24 has been stopped, supply line solenoid 48 closed, drain solenoid 54 opened, compressed air solenoid 228 opened, and air evacuation solenoid 164 closed. Consequently, the liquid remaining in head 70 following the discontinuation of the filtering operation is draining through discharge conduit 52 back to tank 30.

As the liquid level decreases within head 70, float 290 descends and closes contacts 294, but no circuit is completed at this time. When practically all of the liquid has drained from the head 70, the float of the liquid level responsive control 270 breaks contacts 300 and makes contacts 302 which initiates another stage of the cleaning cycle. The breaking of contacts 300, opens the circuits of drain solenoid 54, air evacuation solenoid 164 and of solenoid 228. As a consequence, drain solenoid 54 and air evacuation solenoid 164 are closed and solenoid 228 is closed to discontinue the introduction of compressed air into head 70. At substantially the same time, the closing of contacts 302 starts suction pump 150 and connects it to the interiors of the filter medium backing members 108 to reduce pressure therein so as to hold the loose filter medium material to the backing members. It should be understood that during filtering operation the liquid under pressure in head 70 holds the loose filtering material to the backing members 108; that the compressed air takes up this holding function during liquid evacuation from the head; and that the suction pump 150 takes over the function from the compressed air. In addition to the starting of suction pump 150 and to the opening of solenoid 160, solenoid 50 closes, air vent solenoid 232 opens, timer 266 is energized, upper air cylinder solenoid 180 is energized, and knife indexing solenoid 216 is energized. The circuit of the suction pump 150 is as follows: From main line 372 through lead 432 and the now closed relay contact 340, lead 434, the now closed contacts 322 of liquid level responsive switch 270, leads 436, 452, solenoid 160, lead 454, the motor of suction pump 150, lead 456, solenoid 50, lead 458 to lead 440 and therefore to the other main lead 374. The circuit of air cylinder solenoid 180 and knife indexing solenoid 216 also includes the contacts 302 of liquid level responsive switch 270 and this circuit is as follows: From main line 372 through lead 432, the now closed contacts 340, lead 434, the now closed contacts 302 of liquid level responsive switch 270, leads 436, 439, timer contacts 286, lead 441, solenoid 180, lead 442, solenoid 216, and lead 444 to the other main line 374. Since the timer coil 280 is connected to leads 436 and 480 it will be apparent without tracing the circuit that the coil 280 will be energized when the contacts 302 of the liquid level responsive switch 270 are closed. This is also true of solenoid 232.

The indexing solenoid 216 now operates to move the knife carrier 170 to the right, facing Fig. 4 such that the knives 166 dig slightly into the filter material and air cylinder 174 moves the carrier downwardly thus removing the foreign matter and small amounts of the filtering material from the left-hand side mediums 106. When the knife carrier reaches the bottom of its travel, the timer 266 functions to break contacts 286 and make contacts 288. The breaking of contacts 286 deenergizes the air cylinder solenoid 180 and indexing solenoid 216. As a consequence, air cylinder 200 now operates to shift the knife carrier 170 to the left such that knives 168 now penetrate slightly into the filtering material and the air cylinder 174 now raises the knife carrier to remove the foreign material and some of the filtering material from the surfaces of the right-hand side filter medium 106. The foreign matter and filter material removed from both sides of the filter mediums drops down onto the disposable paper 74 on conveyor belt 78.

The closing of timer contacts 288 completes the following circuit of the lower air cylinder solenoid 102: From main line 372 through leads 376, 400, relay contacts 316, lead 424, the now closed limit switch 366, the now closed timer contacts 288, lead 428, air cylinder solenoid 102 and through lead 430 to the other main line 374. It will be noted that limit switch 366 opened when the knife carrier 170 was moved downwardly whereby to prevent operation of lower cylinder 100 until the carrier returned to its raised or starting position energization of solenoid 102 results in the air cylinder 100 acting to move shell 84 downwardly away from shell 82 to release the conveyor belt 78 and provide clearance between shells 82, 84 and the belt. As the shell 84 approaches its fully down position, it closes limit switch 350 which closes the following circuit of conveyor motor 242. From main line 372 through control relay coil 306, lead 378, the circuit relay contacts 320, leads 384, 380, limit switch 358, leads 382, 373, 375, limit switch 350 and lead 377 to the main lead 374. The conveyor operates to remove the foreign matter and disposable paper 74 from head 70 and replace the paper within the head whereupon one of the conveyor carried lugs 364 opens switch 358 which breaks the holding circuit of control relay 304. This ends the cleaning cycle and initiates return to the filtering cycle. The deenergization of control relay 304, of course, results in the return of the moving elements, switches, valves, etc. to the normal positions shown in Fig. 14. This includes the closing of shell 84 which simultaneously with stopping of conveyor motor 242 moves up and opens the motor circuit at limit switch 350. The relay 322, solenoid 48 and pump motor 36 are energized when the final closing movement of shell 84 closes limit switch 324. Energization of relay 322 opens the drain solenoid 54, solenoid 50, solenoids 228, 230, 164 and closes solenoid 160 and 232. As the pump 24 delivers liquid to the head 70, the increasing liquid therein breaks the contacts 302 of liquid level responsive switch 270 and closes the contacts 300. This deenergizes timer 266, and consequently solenoid 232. During the filling of head 70, the contacts 294 of the upper liquid level responsive switch 26 remain closed substantially until the head is filled. As a result, solenoids 228, 230 and 164 are open. These circuits are as follows: From main lead 372 through lead 446, relay contacts 336, lead 448, contacts 294, leads 450, 412, solenoid 164 and lead 416 to the other main line 374. The circuit of solenoid 228 includes leads 450, 416, solenoid 228 and lead 418 to the other main line 374. Also the circuit of solenoid 230 includes leads 416, 422, solenoid 230, lead 420, control relay contacts 314 and through lead 420 to the other main line 374. These solenoids remain open as the head is filling so as to allow air to escape therefrom and when the head is nearly completely filled, float contacts 294 are opened resulting in the closing of solenoids 164, 228 and 230. The head 70 now completely filled with liquid, the pump 24 acts to force the liquid through the filter mediums until the next cleaning cycle is initiated. After a number of cleaning cycles, it will be necessary to recoat the backing members 108 and the knife indexing mechanism is returned to its starting position by means of the hand crank 214.

While I have shown and described my invention in considerable detail, it is to be understood that the invention is to be limited only by the spirit and scope of the appended claims.

I claim:

1. In a liquid filter aparatus, a support, a head on said support having a normally open inlet for liquid to be filtered and having a normally closed drain, a backing member within said head having opposite liquid pervious surfaces, loose granules coating said surfaces to provide spaced filter media, said backing member having a normally open outlet out of said head, a pump normally supplying contaminated liquid to said head and maintaining a liquid pressure therein above atmospheric pressure to force the liquid through the head and also to hold the granules to said backing member, a control responsive to a predetermined increase in the back pressure within said head to close said inlet and head outlet and open said drain, means operable to introduce compressed air into said head to hold the granules to said backing member on loss of the liquid pressure, means operable to effect a partial vacumm within said backing member to hold the granules thereto, a control responsive to predetermined decrease in the level of the liquid draining from said head to shut off the compressed air and start the vacuum effecting means, a movable carrier having a pair of scrapers on opposite sides of said backing member, said carrier movable in one direction to remove the foreign matter and some of the granules from one surface of the filter media and movable in the opposite direction to remove the foreign matter and some of the granules from the opposite surface of the media, said carrier controlled by said liquid level responsive control, an indexing mechanism operable to index said carrier to engage one of the scrapers with one of the filter media surfaces on travel of the carrier in one direction and to engage the other scraper with the other of said filter media surfaces for travel of the carrier in the opposite direction, and a timer controlling movement of said carrier and said indexing mechanism and controlled by said liquid level responsive control.

2. A liquid filter apparatus comprising, a support, a filter head on said support having an inlet for liquid to be filtered and an outlet for the filtered liquid, a hollow backing member within said head having a liquid pervious area presented to the liquid within the head and said hollow backing having its interior in communication with said outlet, a granular material forming a filter medium over said surface and held thereto by the liquid pressure within said head, a pump supplying liquid to be filtered to said head and maintaining the pressure therein above atmospheric pressure to effect forced filtering through said medium and to hold the granules to the backing member, means operable to discontinue supply of liquid to the head and therefore filtering of liquid, means operable to decrease the pressure within said hollow backing member below atmospheric pressure to hold the filter medium thereto when the liquid pressure decreases on discontinuation of filtering, an outlet in said head on the inlet side of said filter medium for discharge of the liquid remaining in the head following discontinuation of filtering, normally closed valve means controlling said second outlet, scraper means within said head operable to move through a path of travel scraping the foreign matter from the filter medium, a second filter medium within said head between said inlet and said second outlet and on which the foreign matter scraped from the first outlet is deposited, said second filter medium being part of an elongated filter media movable to remove the foreign matter out of the head and replace the second filter medium, and automatically operable control means controlling all of said aforementioned means and movement of said filter media.

3. A liquid filter apparatus comprising, a support, a filter head having an inlet for liquid to be filtered and an outlet for the filtered liquid, a hollow backing member within said filter head having a liquid pervious side to which a granular filter material is held as the filter medium, the interior of said hollow backing member in communication with said outlet, a pump supplying the liquid to be filtered to said inlet and maintaining the liquid within said head above atmospheric pressure to effect forced filtering of the liquid through said filter medium and also hold the granular material to said backing member, means operable to discontinue supplying liquid to the head by the pump and therefore the filtering operation, a drain in the head on the inlet side of the filter medium for discharge of the liquid remaining in the head following discontinuation of filtering, means operable to introduce fluid under pressure greater than atmospheric pressure into said head to evacuate the liquid and also hold the filter medium to said backing member during said evacuation, a control responsive to a predetermined increase in liquid pressure within said head operable to close said inlet and outlet and open said drain and also controlling said means, a normally inactive suction pump communicating with the interior of said hollow backing member, and operable to reduce the pressure therein below atmospheric pressure to hold the granular material to the backing member, a control responsive to a predetermined decrease in level of the liquid draining from said head to discontinue operation of said means and start said suction pump, a scraper operable to remove accumulated foreign matter from the surface of said medium and controlled by said liquid level responsive control, and a timer timing the operation of said scraper and controlled by said liquid level responsive control.

4. In a liquid filter apparatus, a support, a filter head on said support having a normally open inlet for liquid to be filtered and a normally closed drain, a backing member within said head having an outlet from the head for filtered liquid and having a liquid pervious surface, a coating of granules on said surface constituting a filter medium, a pump normally supplying contaminated liquid to the head and maintaining the liquid under greater than atmospheric pressure to effect forced filtering and hold the coating of granules to the backing member, a control responsive to a predetermined increase in back pressure within said head to close said inlet and outlet and open said drain, means to introduce air into said head to pressurize the head on loss of the liquid pressure and controlled by said pressure responsive switch, a suction pump in communication with the interior of said backing member and operable to reduce the presure therein below atmospheric pressure to hold the granules to said backing member, a control responsive to liquid level decrease in said head to discontinue introduction of air into said head and start the suction pump to reduce pressure within said backing member, a scraper within said head controlled by said liquid level responsive control and movable to scrape foreign matter from the surface of the filter medium, power means operable to move said scraper, said head including separable sections, a conveyor passing laterally through said head at the joint of said sections below said filter medium to catch the foreign matter scraped therefrom, a power element operable to separate said sections, and a delayed action control under control of said liquid level responsive control and controlling operation of both of said power elements.

References Cited in the file of this patent

UNITED STATES PATENTS

| 1,288,508 | Chapin | Dec. 24, 1918 |
| 1,853,263 | Dudley | Apr. 12, 1932 |
| 1,870,381 | Piper | Aug. 9, 1932 |
| 2,232,716 | Mills | Feb. 25, 1941 |
| 2,494,534 | Armstrong | Jan. 17, 1950 |
| 2,603,354 | Way et al. | July 15, 1952 |